Patented June 19, 1951

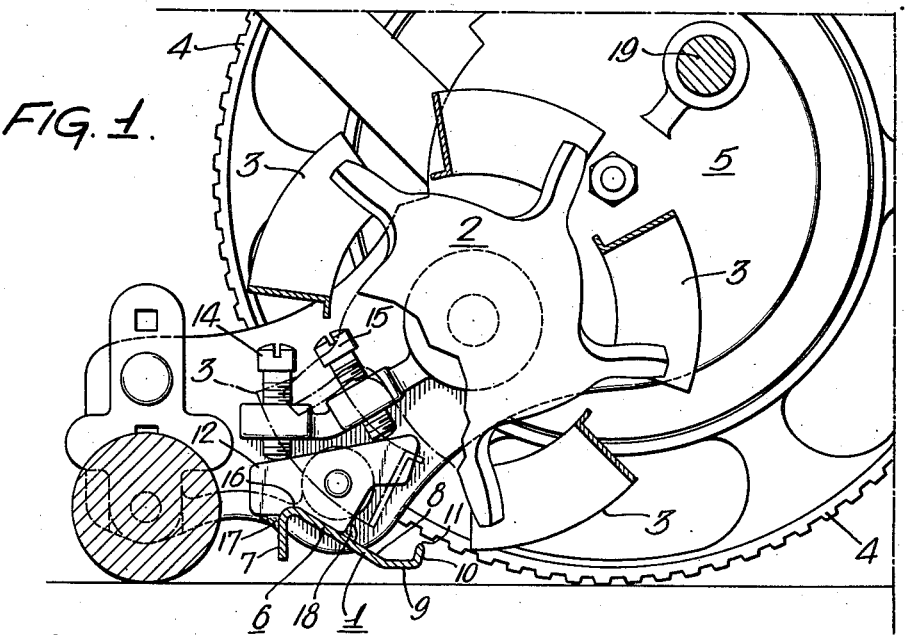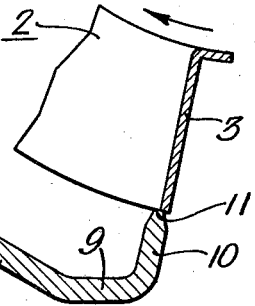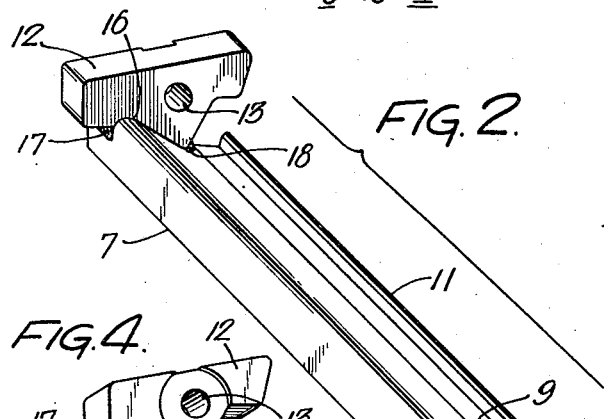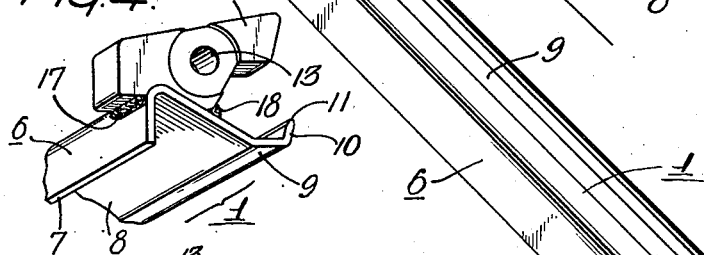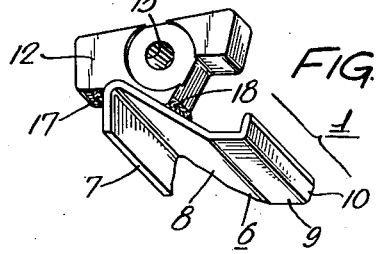

2,557,897

UNITED STATES PATENT OFFICE 2,557,897

CUTTER BAR FOR LAWN MOWERS

Robert J. Sullivan, Reading, Pa., assignor to Reading Hardware Corporation, Reading, Pa., a corporation of Pennsylvania Application August 28, 1946, Serial No. 693,416

7 Claims. (Cl. 56—289)

This invention relates to new and useful improvements in lawn mowers and more particularly to the relatively fixed cutting element or cutter bar thereof, being a continuation-in-part of my copending application Serial No. 667,686, filed May 6, 1946, now abandoned.

In lawn mowers of conventional type, the so-called cutter bar performs two functions. First, it acts as a tie-rod in conjunction with the other tie rod at the top of the mower to hold the chassis or side frames of the lawn mower together and, second, it supports the knife or bed blade in the mower in the desired relation to the cutting reel.

Prior to the present invention the fixed cutting element of a lawn mower generally consisted of two parts, usually a relatively heavy cutter bar made of rolled steel section or cast iron to provide the necessary rigidity, and a relatively light and flexible knife or blade member, the bar functioning as stated to tie the chassis or side frames of the mower together and also to support the blade in cutting association with the reel of the mower. This assembly of blade and cutter bar is quite heavy, adding materially to the weight of the mower, and is comparatively expensive to manufacture. Furthermore, and highly important, since the blades of the fixed cutting elements of lawn mowers are supported by or upon relatively heavy cutter bars fabricated as described, the blades are lacking in adequate resiliency and flexibility with the result that they become permanently deflected and distorted when they strike stones, rocks and other hard obstacles.

With the foregoing in mind, the principal object of the present invention is to provide a one-piece fixed cutting element for lawn mowers which embodies sufficient stiffness and rigidity to function properly as a tie-rod between the mower side frames and which at the same time has sufficient inherent flexibility to be self-aligning and self-adjusting to the cutting reel.

Another object of the present invention is to provide a novel fixed cutting element for lawn mowers which is relatively light in weight and which possesses a characteristic springiness operable to minimize permanent deflection and distortion of the blade upon striking hard obstacles.

Another object of the invention is to provide a fixed cutting element as set forth which is comparatively simplified in construction and substantially inexpensive to manufacture.

Another object of the present invention is to provide a novel fixed cutting element for lawn mowers as set forth which, while having a characteristic resiliency tending to minimize distortion thereof, embodies sufficient rigidity and stiffness normally to provide good cutting properties in cooperation with the blades of the cutting reel.

A further object of the invention is to provide a novel method for manufacturing fixed cutting bars for lawn mowers embodying the features and characteristics set forth.

These and other objects of the invention and the various features and details of the construction and manufacture thereof are hereinafter fully set forth and described with reference to the accompanying drawing; in which:

Fig. 1 is a partial sectional view of a lawn mower embodying a cutter bar made according to the present invention.

Fig. 2 is a perspective view of the cutter bar.

Fig. 3 is an enlarged partial sectional view taken transversely of the cutter bar showing the same in cutting relation to the blades of the cutting reel of the mower; and Figs. 4 and 5 are fragmentary perspective views respectively showing the construction and arrangement of the ends of the cutter bar.

Referring now to the drawing, a fixed cutter bar made according to the present invention is generally designated by the reference numeral 1 and in Fig. 1 is shown in association with a conventional type lawn mower comprising essentially a cutting reel 2 having blades 3 which is rotationally driven in the usual manner by mechanism associated with the wheels 4 carried by the side frames 5 of the mower.

According to the present invention the cutter bar 1 comprises an elongated sheet metal stamping 6 of generally Z-shape in cross-section. More particularly, the member 6 comprises a rearward substantially vertical leg portion 7 which at its upper edge curves into a forwardly declining angular web portion 8 that merges into a horizontally extending narrow web portion 9 which terminates at its outer edge in a forwardly inclined leg portion 10 having its free end edge ground as indicated for example in Fig. 3, to provide a cutting edge 11. The several portions 7, 8, 9 and 10 of the member 6 are of uniform thickness through the length and width of the member.

In accordance with the invention, the cutting member 6 is stamped from a flat sheet of metal such as, for example, steel, of uniform thickness and after the member has been stamped from the sheet it is heated to the particular austenitic temperature of the steel sheet material employed. When heated to this temperature and while still hot, the heated blank is quickly cooled by a suitable quenching medium such as water or oil. This cooling can be done by spraying the liquid onto the hot member or by immersing the hot member into the cooling medium. Preferably the cutting member 6 is preformed or stamped from cold sheet material and then heat treated in a jig or vessel which serves to accurately retain the configuration and various dimensions of the member during the heat-treating operation and when properly heat treated the member 6, still supported in the jig or vessel, is quenched, for example in water or oil.

By way of example, a cutting member made according to the present invention that has been proven highly successful may be produced by stamping the member 6, having the described construction, features and configuration, from a sheet of steel having a carbon content of 0.25% and a uniform thickness of 0.093 inch and then heating the stamped blanks to a temperature of about 1600° F. and subsequently quenching them as described. The heating and quenching operation acts both to form and harden the cutting member at the same time. A subsequent tempering operation can be employed if necessary, depending upon the steel used, or the tempering can be secured by the heat generated when the member 6 is subsequently assembled into a cutter bar by welding as hereinafter described.

A cutting member 6 embodying the foregoing features of construction and made as herein described is extremely light in weight and while sufficient rigidity and stiffness for normal cutting operations is present, the member embodies a characteristic inherent resiliency or springiness which is produced by the combination of their structural shape and heat treatment and which allows it to yield momentarily when it strikes a stone or other hard obstacles thereby minimizing permanent deflection and distortion of the cutting member.

To complete the cutter bar, there is secured to the member 6, at the opposite ends thereof, frame members 12 having an opening 13 therein to receive a spindle or the like by means of which the cutter bar 1 is mounted on and between the side frames 5 of the lawn mower where it is secured in adjustable position relative to the blades 3 of the cutting reel 2 in the conventional manner by means of set screws or the like 14 and 15 which engage the end frame members 12 at opposite sides of the axis upon which the cutter bar 1 is mounted.

A feature of the invention is concerned with the construction and arrangement of the cutter bar end frame members 12 and the manner in which they are secured to the opposite ends of the cutting member 6. Thus, with reference to the drawing, it is to be noted that the cutter bar end frame members 12 are constructed or contoured as indicated at 16 to overlie and conform substantially to the surface of the cutting member 6 commencing from the point at which the upper edge of the rearward vertical leg 7 of the member 6 commences to curve into the forwardly declining angular web portion 8 to a point approximately midway downwardly along the latter portion as shown. In this connection, it is pointed out that it is not essential that the entire overlying portion 16 of the end frames 12 contact or seat upon the subjacent surface portions of the cutting member 6 and it is necessary merely that contact between the cutting member 6 and end frame members 12 occur at any two relatively spaced points of the contoured portion 16 thereof. This eliminates the necessity for precision machining of the surface portion 16 of the end frame members 12 which is adapted to overlie the ends of the cutting member 6 and hence both considerable time and expense are saves in manufacture of the cutter bars. The end frame members 12 are each welded to the underlying cutting member 6 as indicated, for example, at 17 and 18, respectively.

The acute angular relation of the rear leg 7 and declining web portion 8 of the member 6 arranged as described provides a stiff angle section, and by securing the end frame members 12 to the cutting member 6 at this angle section thereof sufficient stiffness and rigidity are imparted to the cutter bar 1 to enable it to function effectively in combination with the upper tie-rod 19 to tie together the side frames of the mower. It is to be noted, however, that the lower portion of the web 8 and horizontal smaller web 9 as well as the cutting leg portion 10 are relatively free of the end frame members 12 and unsupported thereby with the result that full advantage may be taken of the inherent resiliency or springiness of the cutting member 6 to thereby minimize permanent distortion and deflection of the member 6 upon striking hard obstacles and at the same time provide the flexibility for the member 6 to be self-aligning and self-adjusting to the cutting reel of the mower.

From the foregoing description it will be apparent that the present invention provides a novel one-piece fixed cutting element for lawn mowers which embodies sufficient stiffness and rigidity to function properly as a tie-rod between the mower side frames and which at the same time has sufficient inherent flexibility to be self-aligning and self-adjusting to the cutting reel. The invention likewise provides a fixed cutting element for lawn mowers which is relatively light in weight and which possesses a characteristic springiness operable to minimize permanent deflection and distortion of the blade upon striking hard obstacles. The invention also provides a fixed cutting element as set forth which is comparatively simplified in construction and substantially inexpensive to manufacture. Furthermore, the invention provides a novel fixed cutting element for lawn mowers as set forth which, while having a characteristic resiliency tending to minimize distortion thereof, embodies sufficient rigidity and stiffness normally to provide good cutting properties in cooperation with the blades of the cutting reel.

While a particular embodiment of the invention has been illustrated and described herein, it is not intended that the invention be limited to such disclosure and changes and modification may be made therein and thereto within the scope of the claims.

I claim:

1. A cutter bar for lawn mowers comprising an elongated sheet metal member of generally Z-shape in cross-section including an upstanding rearward leg portion terminating at its upper edge in an angularly declining web portion the forward edge of which terminates in a relatively narrower web portion disposed at right angles to said rearward leg, said narrower web portion terminating at its forward edge in an upstanding relatively short leg portion disposed at right angles to the narrower web portion and having at its free edge a cutting face angularly disposed with respect to the plane of said upstanding leg, said member having an inherent springiness in a direction transversely thereof to cause the member to yield momentarily upon striking a hard obstacle and thereby minimize permanent deflection and distortion of said member.

2. A cutter bar for lawn mowers comprising an elongated sheet metal member of generally Z-shape in cross-section including an upstanding rearward leg portion curving at its upper edge into an angularly declining web portion the forward edge of which terminates in a relatively narrower web portion disposed at right angles to said rearward leg, said narrower web portion terminating at its forward edge in an upstanding relatively short leg portion disposed at right angles to the narrower web portion and having at its free edge a cutting edge angularly disposed with respect to the plane of said upstanding leg, and rigid frame members permanently secured to said member at opposite ends thereof, said member having an inherent springiness in a direction transversely thereof to cause the member to yield momentarily upon striking a hard obstacle and thereby minimize the permanent deflection and distortion of said member.

3. A cutter bar for lawn mowers comprising an elongated sheet metal cutting member of uniform metal thickness having a generally Z-shape in cross-section including an upstanding rearward leg portion curving at its upper edge into an angularly declining web portion, and rigid end frame members secured to opposite ends of the cutting member and overlying the surface of the latter in the portion thereof comprising the curved junction between said rearward leg and said declining angular web and downwardly along the latter approximately one-half the transverse width thereof, the properties of said sheet metal cutting member and the location of said end frame members thereon cooperating to provide an inherent springiness in said cutting member in a direction transversely thereof to cause said member to yield momentarily upon striking a hard obstacle and thereby minimize the permanent deflection and distortion of said cutting member.

4. A cutter bar for lawn mowers comprising an elongated sheet metal cutting member of uniform metal thickness having a generally Z-shape in cross-section including an upstanding rearward leg portion curving at its upper edge into an angularly declining web portion, rigid end frame members at opposite ends of the cutting member and overlying the surface of the latter in the portion thereof comprising the curved junction between said rearward leg and said declining angular web and downwardly along the latter approximately one-half the transverse width thereof, and means permanently securing said end frame members to said cutting member at least at relatively spaced points transversely of the cutting member, the properties of said sheet metal cutting member and the location of said end frame members thereon cooperating to provide an inherent springiness in said cutting member in a direction transversely thereof to cause said member to yield momentarily upon striking a hard obstacle and thereby minimize the permanent deflection and distortion of said cutting member.

5. A cutter bar for lawn mowers comprising an elongated sheet metal cutting member of uniform metal thickness having a generally Z-shape in cross-section including an upstanding rearward leg portion curving at its upper edge into an angularly declining web portion the forward edge of which terminates in a relatively narrower web portion disposed at right angles to said rearward leg, said narrower web portion terminating at its forward edge in an upstanding relatively short leg portion disposed at an obtuse angle to the narrower web portion and having at its free edge a cutting edge, and rigid end frame members secured to opposite ends of the cutting member and overlying the surface of the latter in the portion thereof comprising the curved junction between said rearward leg and said declining angular web and downwardly along the latter approximately one-half the transverse width thereof, the properties of said sheet metal cutting member and the location of said end frame members thereon cooperating to provide an inherent springiness in said cutting member in a direction transversely thereof to cause said member to yield momentarily upon striking a hard obstacle and thereby minimize the permanent deflection and distortion of said cutting member.

6. A cutter bar for lawn mowers comprising an elongated sheet metal cutting member of uniform metal thickness having a generally Z-shape in cross-section including an upstanding rearward leg portion curving at its upper edge into an angularly declining web portion the forward edge of which terminates in a relatively narrower web portion disposed at right angles to said rearward leg, said narrower web portion terminating at its forward edge in an upstanding relatively short leg portion disposed at an obtuse angle to the narrower web portion and having at its free edge a cutting edge, rigid end frame members at opposite ends of the cutting member and overlying the surface of the latter in the portion thereof comprising the curved junction between said rearward leg and said declining angular web and downwardly along the latter approximately one-half the transverse width thereof, and means permanently securing said end frame members to said cutting member at least at relatively spaced points transversely of the cutting member, the properties of said sheet metal cutting member and the location of said end frame members thereon cooperating to provide an inherent springiness in said cutting member in a direction transversely thereof to cause said member to yield momentarily upon striking a hard obstacle and thereby minimize the permanent deflection and distortion of said cutting member.

7. A cutter bar for lawn mowers comprising an elongated sheet metal cutting member of uniform metal thickness having a generally Z-shape in cross-section including an upstanding rearward leg portion curving at its upper edge into an angularly declining web portion the forward edge of which terminates in a relatively narrower web portion disposed at right angles to said rearward leg, said narrower web portion terminating at its forward edge in an upstanding relatively short leg portion disposed at an obtuse angle to the narrower web portion and having at its free edge a cutting edge, rigid end frame members at opposite ends of the cutting member and overlying the surface of the latter in the portion thereof comprising the curved junction between said rearward leg and said declining angular web and downwardly along the latter approximately one-half the transverse width thereof, and welds at relatively spaced points transversely of the cutting member permanently securing said end frame members to said cutting member, the properties of said sheet metal cutting member and the location of said end frame members thereon cooperating to provide an inherent springiness in said cutting member in a direction transversely thereof to cause said member to yield momentarily upon striking a hard obstacle and therefore minimize the permanent deflection and distortion of said cutting member.

ROBERT J. SULLIVAN.

REFERENCES CITED

The following references are of record in the file of this patent:

UNITED STATES PATENTS

| Number | Name | Date |
|---|---|---|
| 1,500,571 | Frandenburg | July 8, 1924 |
| 1,809,810 | Coldwell | June 9, 1931 |
| 2,045,386 | Gottschalk | June 23, 1936 |
| 2,089,887 | Funk | Aug. 10, 1937 |
| 2,183,358 | Six | Dec. 12, 1939 |